United States Patent
Shih et al.

(10) Patent No.: US 12,514,820 B2
(45) Date of Patent: Jan. 6, 2026

(54) PHARMACEUTICAL COMPOSITION OF INTRA-ARTICULAR CORTICOSTEROID FOR PAIN CONTROL

(71) Applicants: TAIWAN LIPOSOME COMPANY, LTD., Taipei (TW); TLC BIOPHARMACEUTICALS, INC., South San Francisco, CA (US)

(72) Inventors: Sheue-Fang Shih, Taipei (TW); Carl Oscar Brown, Taipei (TW)

(73) Assignees: TAIWAN LIPOSOME CO., LTD., Taipei (TW); TLC BIOPHARMACEUTICALS, INC., South San Francisco, CA (US)

( * ) Notice: Subject to any disclaimer, the term of this patent is extended or adjusted under 35 U.S.C. 154(b) by 384 days.

(21) Appl. No.: 18/040,454

(22) PCT Filed: Aug. 5, 2021

(86) PCT No.: PCT/US2021/044619
§ 371 (c)(1),
(2) Date: Feb. 3, 2023

(87) PCT Pub. No.: WO2022/031898
PCT Pub. Date: Feb. 10, 2022

(65) Prior Publication Data
US 2023/0285293 A1    Sep. 14, 2023

Related U.S. Application Data

(60) Provisional application No. 63/061,395, filed on Aug. 5, 2020.

(51) Int. Cl.
| | |
|---|---|
| *A61K 9/127* | (2025.01) |
| *A61K 9/00* | (2006.01) |
| *A61K 31/661* | (2006.01) |
| *A61P 19/02* | (2006.01) |

(52) U.S. Cl.
CPC ............ *A61K 9/127* (2013.01); *A61K 9/0019* (2013.01); *A61K 31/661* (2013.01); *A61P 19/02* (2018.01)

(58) Field of Classification Search
None
See application file for complete search history.

(56) References Cited

U.S. PATENT DOCUMENTS

| | | | |
|---|---|---|---|
| 2015/0174069 A1* | 6/2015 | Hong | A61K 31/573 514/420 |
| 2020/0129541 A1* | 4/2020 | Kano | A61P 19/02 |

FOREIGN PATENT DOCUMENTS

| | | |
|---|---|---|
| WO | 2020/056399 A1 | 3/2020 |

OTHER PUBLICATIONS

Hame et al (Curr Rev Musculoskelet Med, 2013, 6:182-187). (Year: 2013).*
Metcalfe et al (BMC Musculoskeletal Disorders, 2012, 13:153, 1-8). (Year: 2012).*
Maricar et al, Arthritis Research & Therapy, 2017, 19:88) (Year: 2017).*
Hunter et al., "Single intra-articular injection of TLC599 provided sustained pain relief through 24 weeks in participants with symptomatic knee osteoarthritis", Osteoarthritis and Cartilage, 2019, vol. 27, pp. S87-S88.
International Search Report and Written Opinion of PCT/US21/44619, mailed Nov. 17, 2021.

* cited by examiner

*Primary Examiner* — Celeste A Roney
(74) *Attorney, Agent, or Firm* — LEASON ELLIS LLP

(57) ABSTRACT

Provided is a method for treating joint pain in a subject with arthritis. The method comprises administering to the subject with a determined grade of osteoarthritis an effective amount of intra-articular corticosteroid or pharmaceutically acceptable salt thereof in a pharmaceutical composition. Achieved is robustness of the efficacy response to a treatment with intra-articular corticosteroid in predetermined subgroups of the intent-to-treat population.

14 Claims, 13 Drawing Sheets

PHARMACEUTICAL COMPOSITION OF INTRA-ARTICULAR CORTICOSTEROID FOR PAIN CONTROL

BACKGROUND

Technical Field

The present disclosure relates to a method of treating pain or inflammation with a lipid-based delivery system in a subject. The present disclosure also relates to a sustained-release pharmaceutical composition adapted to the lipid-based delivery system, which has a prolonged duration of efficacy of a drug.

Description of Related Art

Intra-articular (IA) steroid injection is a current treatment recommendation for individuals with osteoarthritis (OA) by Osteoarthritis Research Society International (OARSI) guidelines in 2019. Although IA injection of corticosteroid was known to contribute to the relief of osteoarthritis associated pain, it has uncertainty in terms of consistent level of efficacy: its efficacy rate may vary among arthritis-affected individuals during disease progression. IA corticosteroid (IACS), IA hyaluronic acid, and aquatic exercise were Level 1B/Level 2 treatments recommended for Knee OA, dependent upon comorbidity status, but were not recommended for individuals with hip or polyarticular OA.

Even though sustained-release lipid-based formulation of dexamethasone sodium phosphate (DSP) was designed for IA injection in the treatment of pain from knee osteoarthritis (International Publication No. WO2020/056399 A1), there is an unmet need for establishing the robustness of the efficacy response to a treatment with IA steroid, particularly to Group B and Group C steroid by Coopman Classification, within the intent-to-treat population.

SUMMARY

In one aspect, the present disclosure provides a method for treating joint pain in a human subject with arthritis, comprising intraarticularly administering to the human subject with a determined grade of osteoarthritis an effective amount of intra-articular corticosteroid or pharmaceutically acceptable salt thereof in a pharmaceutical composition, wherein the determined grade of osteoarthritis is Kellgren-Lawrence Grade 2 or Grade 3.

In another aspect, the present disclosure provides use of a pharmaceutical composition of intra-articular corticosteroid for manufacture of a medicament for treatment of joint pain in a human subject with arthritis. The pharmaceutical composition of IACS comprises an effective amount of IACS or pharmaceutically acceptable salt thereof and a lipid mixture. The pharmaceutical composition is intraarticularly administered to a human subject with a determined grade of osteoarthritis which is Kellgren-Lawrence Grade 2 or Grade 3.

In another aspect, the present disclosure provides a pharmaceutical composition of intra-articular corticosteroid for use in treating joint pain in a human subject with arthritis. The pharmaceutical composition comprises an effective amount of IACS or a pharmaceutically acceptable salt thereof and a lipid mixture, wherein determined grade of osteoarthritis of the human subject is Kellgren-Lawrence Grade 2 or Grade 3.

In some embodiments, the human subject is at an age between 50 to 65 or over 65.

In some embodiments, the human subject is female.

In some embodiments, the human subject has unilateral osteoarthritis pain or bilateral osteoarthritis pain. In some embodiments, the join pain is knee pain.

In some embodiments, the human subject has body mass index (BMI) above, about, or no less than, 30.

In some embodiments, a pharmaceutical composition comprises: (a) a lipid mixture comprising one or more phospholipids; and (b) the intra-articular corticosteroid or pharmaceutically acceptable salt thereof. An exemplary intra-articular corticosteroid according to the present disclosure is dexamethasone sodium phosphate (DSP). An exemplary lipid mixture comprises dioleoylphosphatidylcholine (DOPC) and dioleoylphosphatidylglycerol (DOPG).

In some embodiments, the intra-articular corticosteroid is present in an amount ranging from about 6 mg to about 18 mg per mL, or about 12 mg per mL, of the pharmaceutical composition. In some embodiments, the intra-articular corticosteroid is present in an amount ranging from about 6 mg to about 18 mg, or about 12 mg, in the pharmaceutical composition.

In some embodiments, the subject has knee osteoarthritis of Kellgren-Lawrence Grade 2 or Grade 3. The effective amount of IACS or a pharmaceutically acceptable salt thereof in a pharmaceutical composition is about 12 mg per mL or about 12 mg. The pharmaceutical composition comprises (i) the IACS or a pharmaceutical acceptable salt thereof and (ii) a mixture of DOPC, DOPG and cholesterol at a ratio of 56.25-72.5:7.5-18.75:10-33 by mole percent based on the total moles of the mixture.

According to the change in pain from baseline, treatment of osteoarthritis in a human subject in pre-specified subgroups of the intent-to-treat population with the pharmaceutical composition according to the present disclosure by single or multiple injections demonstrates the safety and the robustness of the efficacy response to a treatment with IACS, particularly to Group B and Group C steroid by Coopman Classification in the pharmaceutical composition according to the present disclosure.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
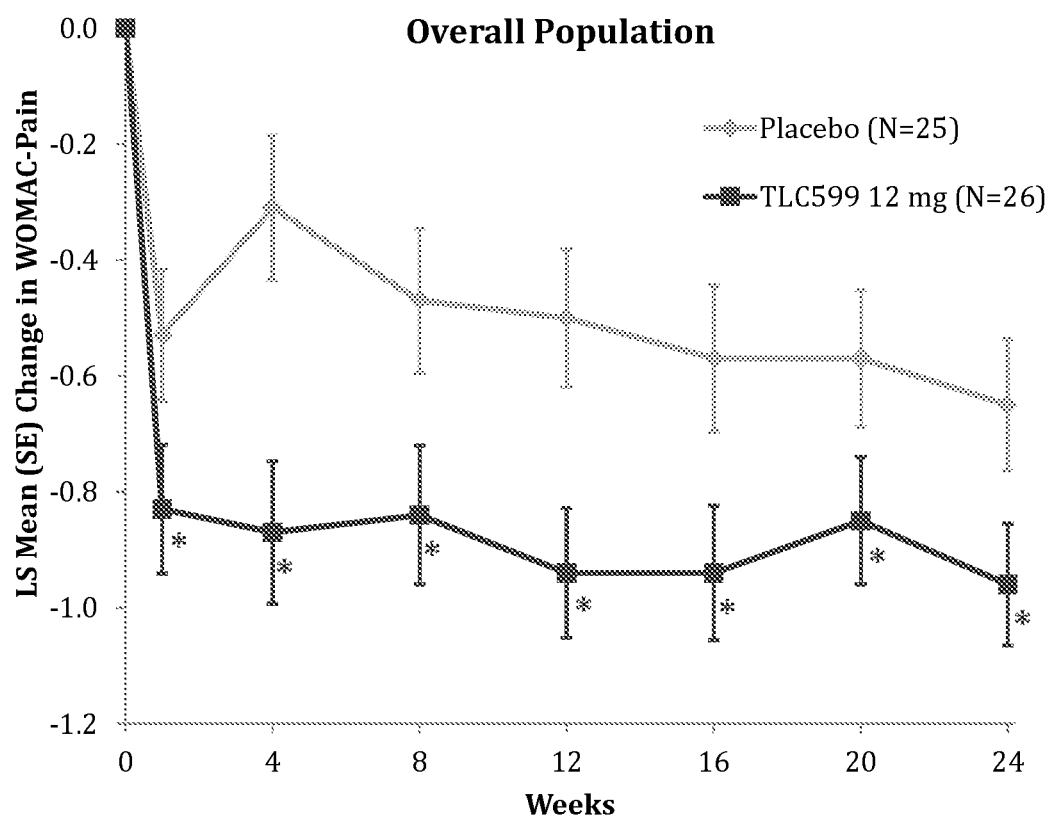
FIG. 1 is a graph illustrating LS Mean (SE) change from baseline in WOMAC-pain (0-4 scale) overall, wherein asterisk mark (*) indicates significant difference versus placebo in overall population with one-sided $p<0.05$; SE=standard error.
Figure 2A:
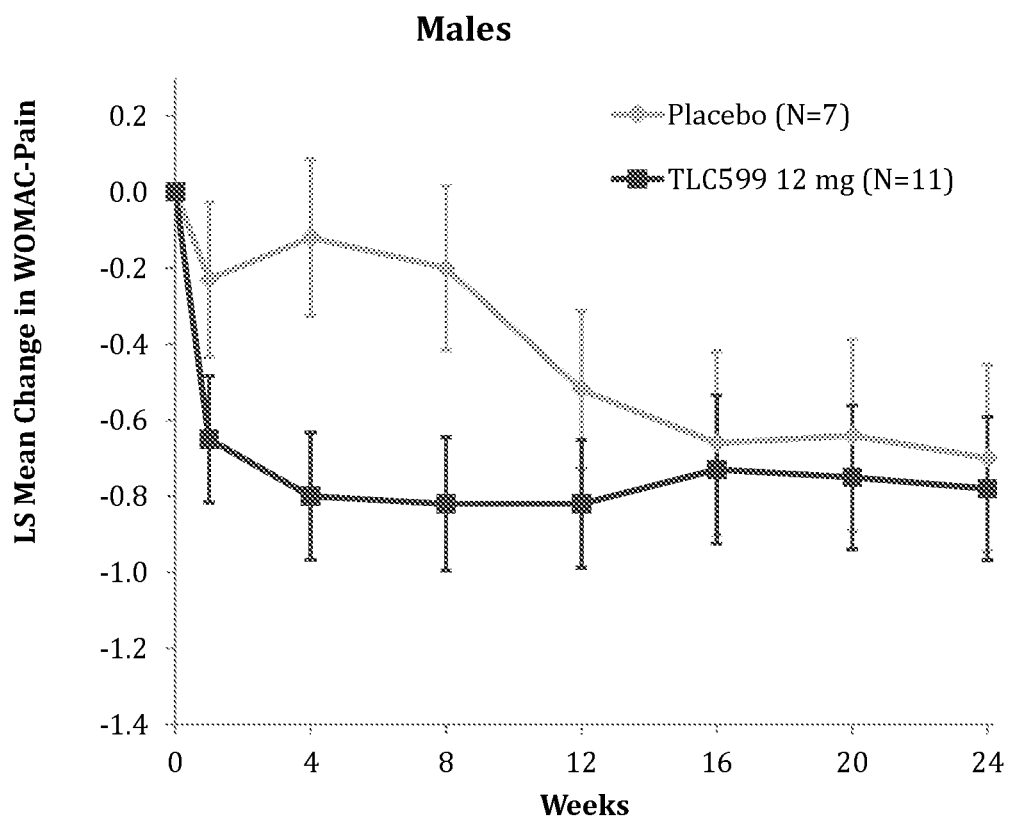
FIGS. 2A, 2B, 2C and 2D are a series of graphs depicting LS Mean (SE) change from baseline in WOMAC-pain (0-4 scale) by gender and age.
Figure 2B:
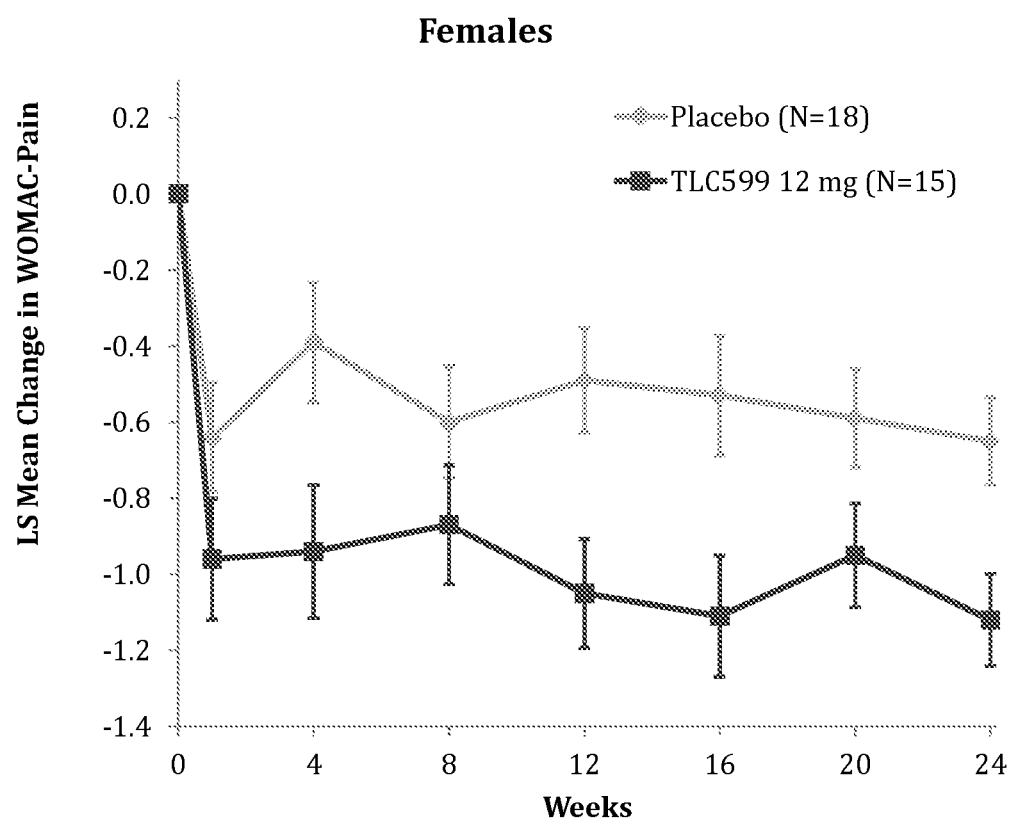
Figure 2C:
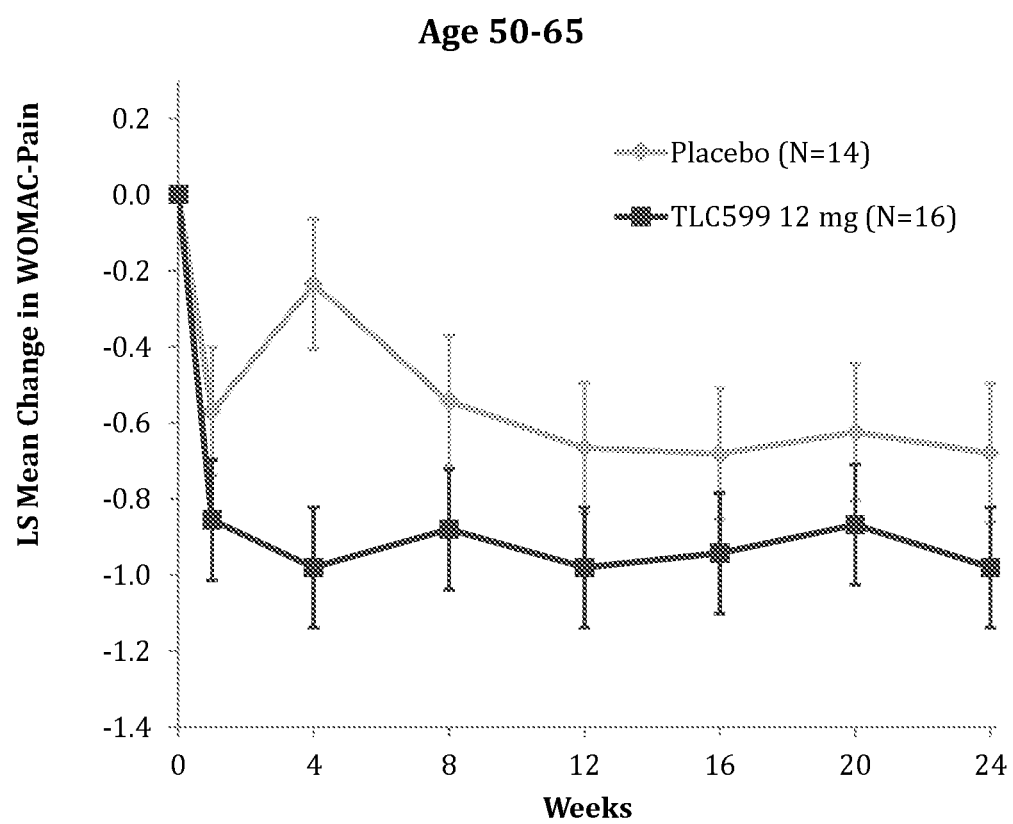
Figure 2D:
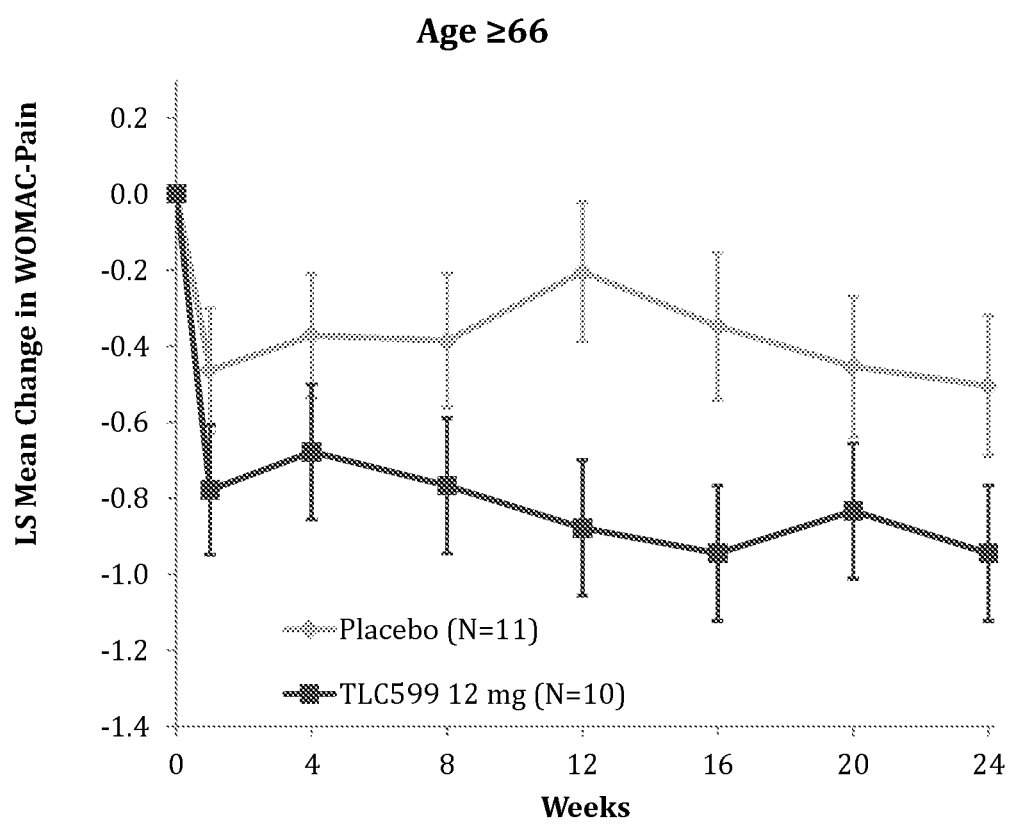
Figure 3A:
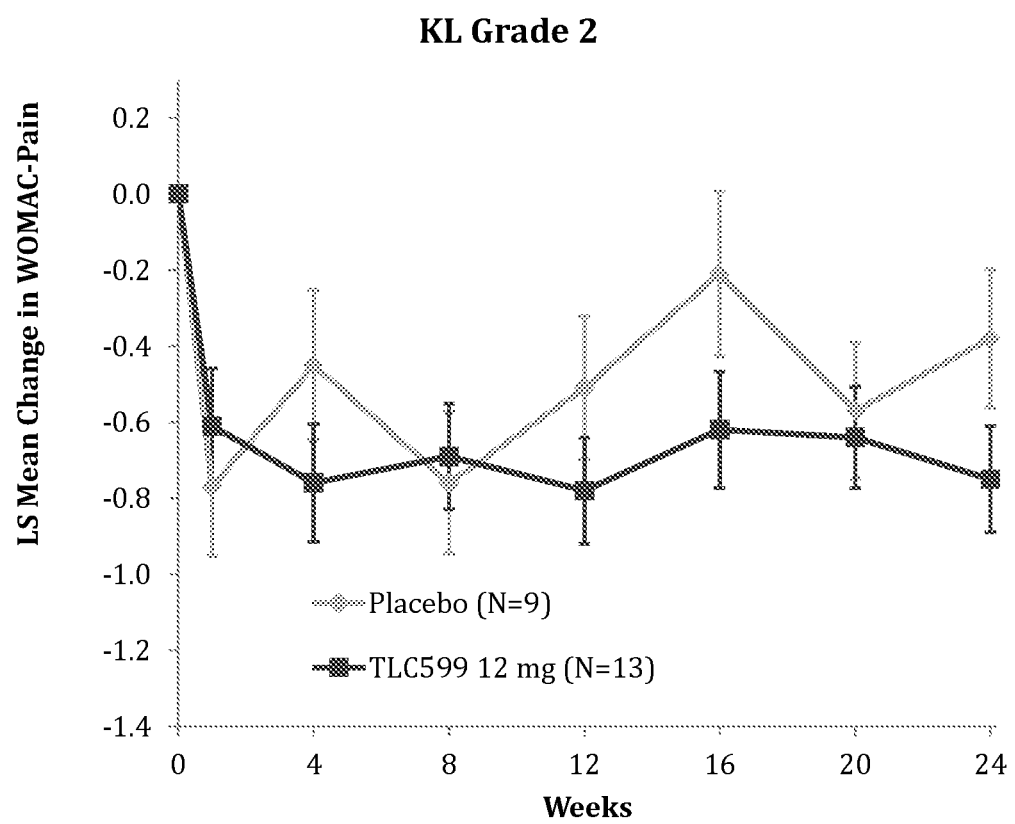
FIGS. 3A, 3B, 3C and 3D are a series of graphs depicting LS Mean (SE) change from baseline in WOMAC-pain (0-4 scale) by K-L grade and unilateral/bilateral knee pain, wherein bilateral knee pain defined as VAS pain score in the non-index knee.
Figure 3B:
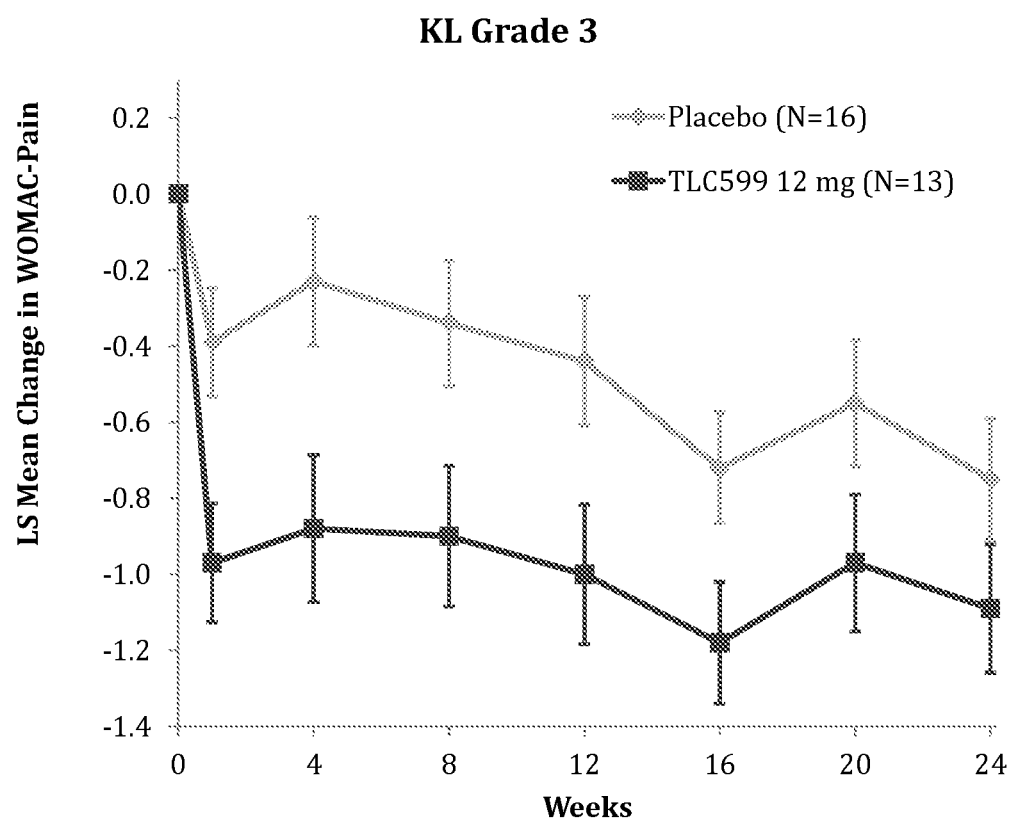
Figure 3C:
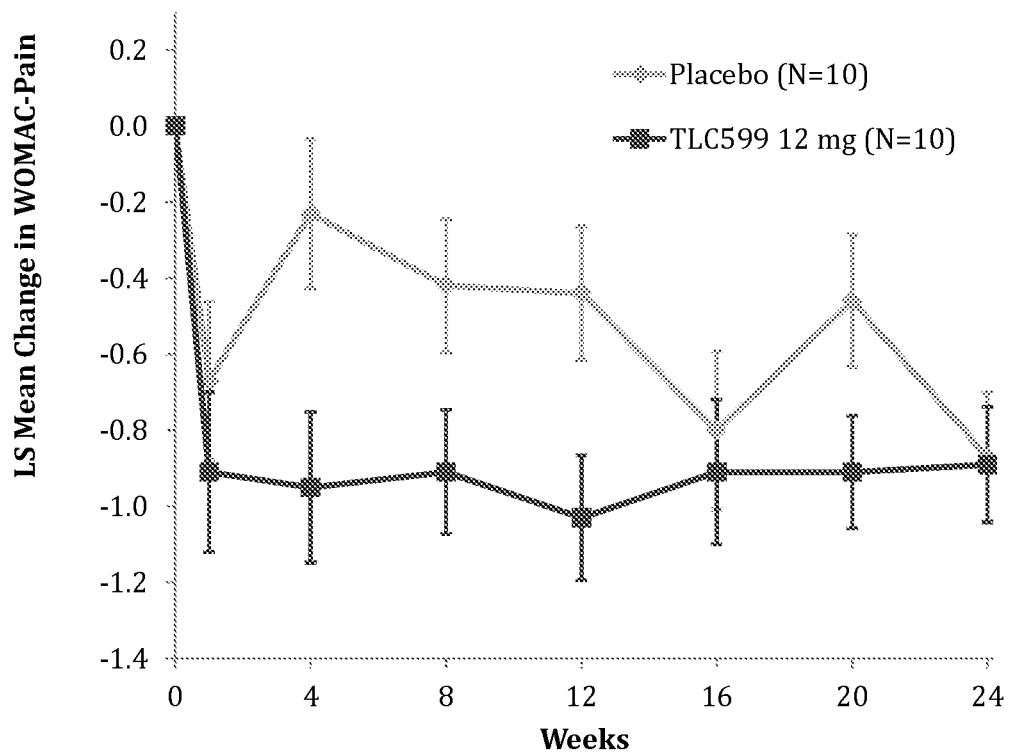
Figure 3D:
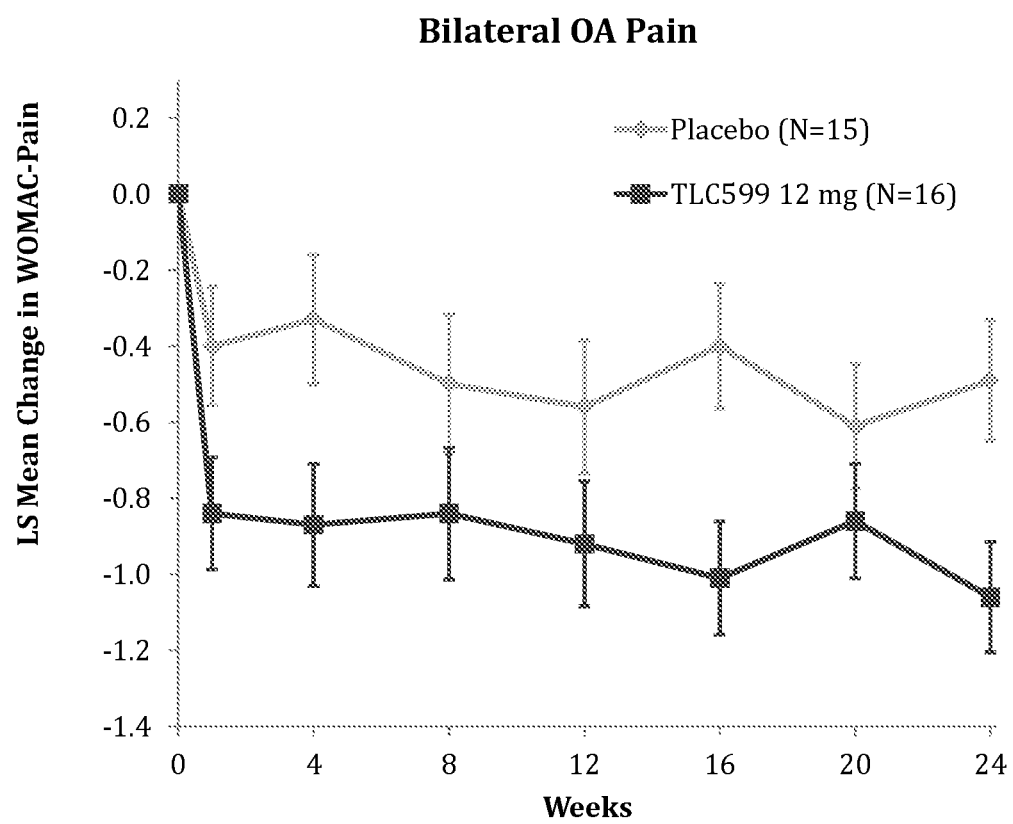
Figure 4A:
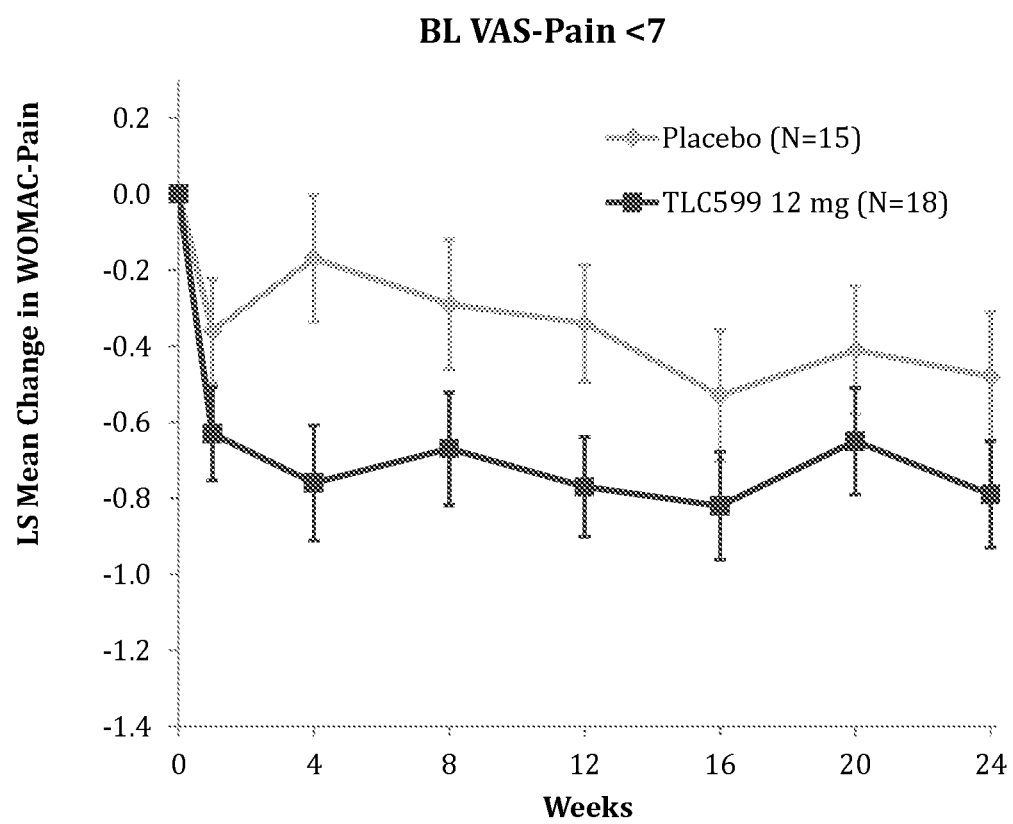
FIGS. 4A, 4B, 4C and 4D are a series of graphs depicting LS Mean (SE) change from baseline VAS pain score and baseline WOMAC-pain score (0-4 scale) by gender and age.
Figure 4B:
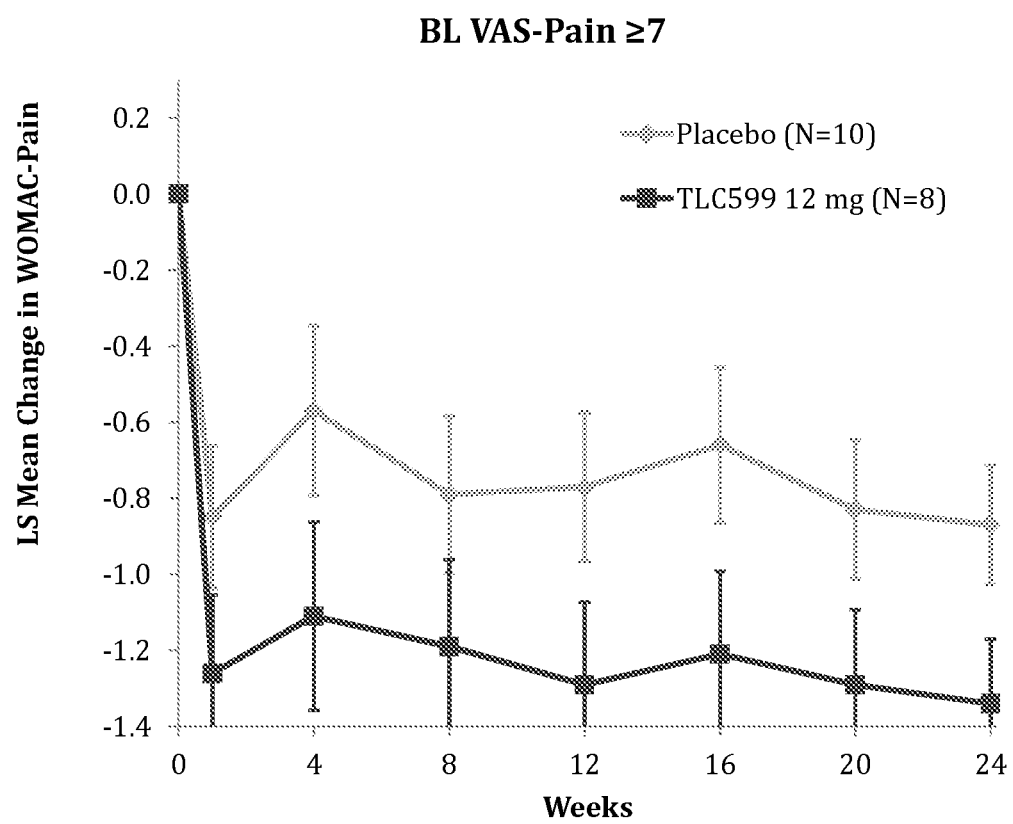
Figure 4C:
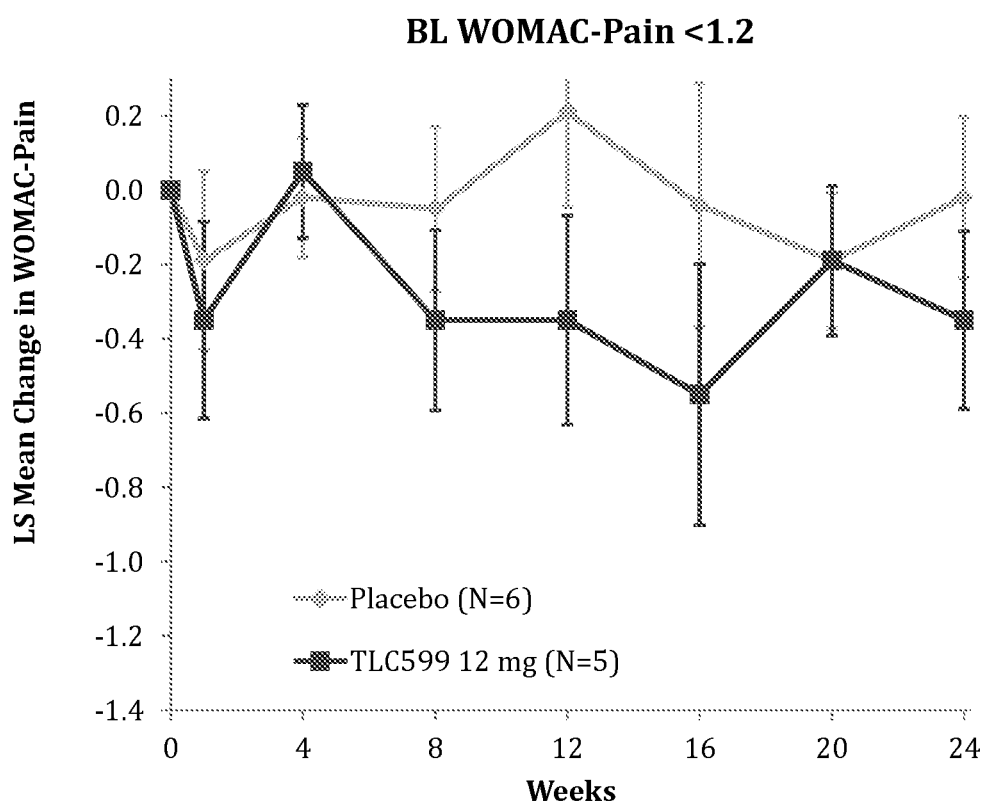
Figure 4D:
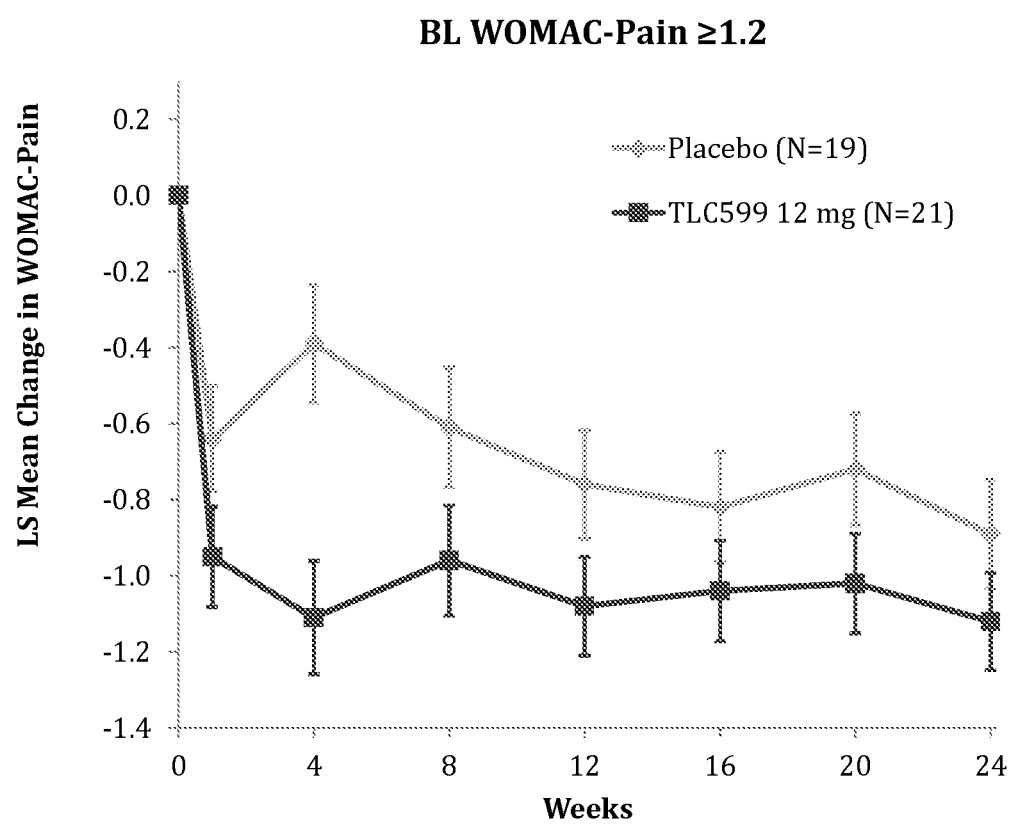

As employed above and throughout the disclosure, the following terms, unless otherwise indicated, shall be understood to have the following meanings.

As used herein, the singular forms "a", "an" and "the" include the plural reference unless the context clearly indicates otherwise.

All numbers herein may be understood as modified by "about," which, when referring to a measurable value such as an amount, a temporal duration, and the like, is meant to encompass variations of ±10%, preferably ±5%, more preferably ±1%, and even more preferably ±0.1% from the specified value, as such variations are appropriate to obtain a desired amount of liposomal drug, unless other specified.

The term "treating," "treated," or "treatment" as used herein includes preventative (e.g. prophylactic), slowing, arresting or reversing progressive structural tissue damage causing joint pain. The terms "treatment" or "treatments" can also refer to compositions or medicaments. Throughout this application, by treating is meant a method of reducing, alleviating, inhibiting or delaying one or more symptoms or signs of osteoarthritis or the amelioration of joint pain as detected by art-known techniques or reduction in use of pain control medications. These include, but are not limited to, clinical examination, imaging, or analysis of serum or joint aspirate (for example, rheumatoid factors, erythrocyte sedimentation rate). Art recognized methods are available to evaluate pains and its symptoms. These include, but are not limited to, 6-point descriptive pain rating scale, 11-point NPRS, visual analog scale, Wisconsin Brief Pain Questionnaire, Brief Pain Inventory, The McGill Pain Questionnaire and the short-form, McGill Pain Questionnaire and other scoring methods including Patient Global Assessment (PGA) of the method of pain control. For a human subject, self-reporting, for example using a graded scale of (0) no pain to (10) maximum pain, could be used to identify level of pain. Optionally, functional magnetic resonance imaging (fMRI) could be used in a subject to identify decreased pain following administration of a pharmaceutical composition of the present disclosure. For example, a disclosed method is considered to be a treatment if there is about or at least 1%, 5%, 10%, 20%, 30%, 40%, 50%, 60%, 70%, 80%, 90% or 100% reduction of joint pain in a subject when compared to the subject prior to treatment or to control subjects. The treatment includes single articular injection or multiple articular injections within a desired interval.

The term "joint pain" refers to a joint disorder or condition that involves inflammation and/or pain of one or more joints. The term "joint pain," as used herein, encompasses a variety of types and subtypes of arthritis of various etiologies and causes, either known or unknown, including, but not limited to, rheumatoid arthritis, osteoarthritis, infectious arthritis, psoriatic arthritis, gouty arthritis, and lupus-related arthritis or painful local tissues affected by bursitis, tenosynovitis, epicondylitis, synovitis and/or other disorders.

"Pharmaceutically acceptable salts" of the intra-articular corticosteroid (IACS) of the present disclosure are salts of an acidic IACS formed with bases, namely base addition salts such as alkali and alkaline earth metal salts, such as sodium, lithium, potassium, calcium, magnesium, as well as ammonium salts, such as ammonium, trimethyl-ammonium, diethylammonium, and tris-(hydroxymethyl)-methyl-ammonium salts. Similarly, acid addition salts, such as of mineral acids, organic carboxylic and organic sulfonic acids, e.g., hydrochloric acid, methanesulfonic acid, maleic acid, are also possible provided to a basic IACS.

Lipid Mixture and Pharmaceutical Compositions Containing the Same

In one aspect, the present disclosure provides a pharmaceutical composition comprising a lipid mixture and an effective amount of an intra-articular corticosteroid (IACS) or a pharmaceutically acceptable salt thereof, wherein the lipid mixture comprising one or more phospholipids and the amount of phospholipids in the pharmaceutical composition is about 20 µmol to 150 µmol per 1 mL.

In one embodiment, the pharmaceutical compositions described herein sustained the release of the IACS for up to 3 months, 4 months, 5 months, 6 months, two weeks, three weeks, four weeks, five weeks, six weeks, seven weeks, eight weeks, night weeks, ten weeks, eleven weeks, twelve weeks, thirteen weeks, fourteen weeks, fifteen weeks, sixteen weeks, seventeen weeks, eighteen weeks, nineteen weeks, twenty weeks, twenty-one weeks, twenty-two weeks, twenty-three weeks, twenty-four weeks, twenty-five weeks, twenty-six weeks, twenty-seven weeks, twenty-eight weeks, twenty-nine weeks, thirty weeks, thirty-one weeks, thirty-two weeks, thirty-three weeks, thirty-four weeks, thirty five weeks, or thirty-six weeks.

In another embodiment, the efficacy of the pharmaceutical composition disclosed herein is increased, relative to the efficacy of a pharmaceutical composition having more than 150 µmol of phospholipids per 1 mL of pharmaceutical composition. In yet another embodiment, the pharmaceutical composition disclosed herein sustains the therapeutic efficacy of the IACS and reduces the side effects associated with the IACS.

In one embodiment, the total amount of the phospholipids is about 50 µmol to less than about 140 µmol per 1 mL of the pharmaceutical composition. In another embodiment, the total amount of the phospholipids is about 45 µmol to less than about 135 µmol per 1 mL of the pharmaceutical composition. In another embodiment, the total amount of the phospholipids is about 50 µmol to less than about 120 µmol per 1 mL of the pharmaceutical composition. In another embodiment, the total amount of the phospholipids is about 60 µmol to less than about 110 µmol per 1 mL of the pharmaceutical composition.

In one embodiment, the pharmaceutical composition further comprises at least one pharmaceutically acceptable excipient, diluent, vehicle, carrier, medium for the active ingredient, a preservative, cryoprotectant or a combination thereof.

In one embodiment, the pharmaceutical composition of the present disclosure is prepared by mixing one or more phospholipids, with or without cholesterol, and one or more buffers to form liposomes, lyophilizing the liposomes with one or more bulking agents to form a lipid mixture in a form of cake and reconstituting the lipid mixture cake with a solution containing the IACS to form an aqueous suspension.

In another embodiment, the pharmaceutical composition of the present disclosure is prepared by mixing one or more phospholipids, with or without cholesterol, in a solvent, then removing the solvent to form a lipid mixture in a form of powder or film, and reconstituting the lipid mixture powder or film with a solution containing the IACS to form an aqueous suspension. In another embodiment, the pharmaceutical composition of the present disclosure is prepared by mixing one or more phospholipids, with or without cholesterol, in a solvent, followed by injection of the dissolved lipid solution into an aqueous solution to form liposomes.

Liposomes are then sized down by filtering through track-etched polycarbonate membranes. Solvent is removed by diafiltration against buffer by means of a semi-automated tangential-flow filtration (TFF) system. The dialfiltrated liposome solution is then lyophilized in a form of powder, and the lipid mixture powder or film is reconstituted with a solution containing the IACS to form an aqueous suspension.

In some embodiments, the pharmaceutical composition of the present disclosure comprises about 10% to about 50% of lipid-associated IACS or about 50% to about 90% of non-associated IACS. The term "non-associated form" refers to the IACS molecules separable via gel filtration from the phospholipid/cholesterol fraction of the pharmaceutical composition and provides immediate release component. In other embodiments, the weight ratio of the combination of the phospholipid and cholesterol to the IACS is about 5-80 to 1. In yet another embodiment, the weight ratio of the combination of the phospholipid and cholesterol to the IACS is about 5-40 to 1. For example, the weight ratio of the combination of the phospholipid and cholesterol to the IACS can be about 5, 10, 15, 20, 25, 30, 35, 40, 45, 50, 55, 60, 65, 70, 75 or 80 to 1.

In some embodiments, the IACS of the pharmaceutical composition of the present disclosure is at a concentration of at least or about 10 mM, 11 mM, 12 mM, 13 mM, 14 mM, 15 mM, 16 mM, 17 mM, 18 mM, 19 mM, 20 mM, 21 mM, 22 mM, 23 mM, 24 mM, 25 mM, 26 mM, 27 mM, 28 mM, 29 mM, 30 mM, 31 mM, 32 mM, 33 mM, 34 mM or 35 mM; and optionally ranging from about 10 mM to about 40 mM, from about 15 mM to about 40 mM, from about 20 mM to about 40 mM, from about 15 mM to about 35 mM, from about 15 mM to about 30 mM, from about 15 mM to about 25 mM, or from about 20 mM to about 25 mM.

In some embodiments, the total amount of the pharmaceutical composition for each administration ranges from about 0.5 mL to about 1.5 mL, and optionally about 1.0 mL.

The lipid mixture of the pharmaceutical composition provided herein refers to a phospholipid or a mixture of phospholipids. The lipid mixture may be, but not limited to, in a form of film, cake, granules or powders before being added to the pharmaceutical composition.

In one embodiment, the phospholipid or the mixture of phospholipids, with or without cholesterol, are pre-formed into liposomes before being further processed into a lipid mixture.

In another embodiment, the phospholipid or mixture of phospholipids, with or without cholesterol, are not pre-formed into liposomes before being further processed into a lipid mixture.

The liposomes may be nano-sized and comprise a lipid bilayer surrounding an internal aqueous agent-carrying component. Non-limiting examples of liposomes include small unilamellar vesicles (SUV), large unilamellar vesicles (LUV), multivesicular liposome (MVL) and multi-lamellar vesicles (MLU).

The lipid mixture can be prepared from a variety of lipids capable of either forming or being incorporated into a unilayer or bilayer structure. The lipids used in the present disclosure include one or more phospholipids, including but are not limited to, phosphatidylcholine (PC), phosphatidylglycerol (PG), phosphatidylethanolamine (PE), phosphatidylserine (PS), phosphatidic acid (PA), phosphatidylinositol (PI) or combinations thereof. In some embodiments, the lipid mixture comprises egg phosphatidylcholine (EPC), egg phosphatidylglycerol (EPG), egg phosphatidylethanolamine (EPE), egg phosphatidylserine (EPS), egg phosphatidic acid (EPA), egg phosphatidylinositol (EPI), soy phosphatidylcholine (SPC), soy phosphatidylglycerol (SPG), soy phosphatidylethanolamine (SPE), soy phosphatidylserine (SPS), soy phosphatidic acid (SPA), soy phosphatidylinositol (SPI) or combinations thereof. In another embodiments, the lipid mixture comprises dipalmitoylphosphatidylcholine (DPPC), 1,2-dioleoyl-sn-glycero-3-phosphatidylcholine (DOPC), dimyristoylphosphatidylcholine (DMPC), dipalmitoylphosphatidylglycerol (DPPG), dioleoylphosphatidylglycerol (DOPG), dimyristoylphosphatidylglycerol (DMPG), hexadecylphosphocholine (HEPC), hydrogenated soy phosphatidylcholine (HSPC), distearoylphosphatidylcholine (DSPC), distearoylphosphatidylglycerol (DSPG), dioleoylphosphatidylethanolamine (DOPE), palmitoyl-stearoylphosphatidylcholine (PSPC), palmitoyl-stearoylphosphatidylglycerol (PSPG), monooleoylphosphatidylethanolamine (MOPE), 1-palmitoyl-2-oleoyl-sn-glycero-3-phosphatidylcholine (POPC), polyethyleneglycol distearoylphosphatidylethanolamine (PEG-DSPE), dipalmitoylphosphatidylserine (DPPS), 1,2-dioleoyl-sn-glycero-3-phosphatidylserine (DOPS), dimyristoylphosphatidylserine (DMPS), distearoylphosphatidylserine (DSPS), dipalmitoylphosphatidic acid (DPPA), 1,2-dioleoyl-sn-glycero-3-phosphatidic acid (DOPA), dimyristoylphosphatidic acid (DMPA), distearoylphosphatidic acid (DSPA), dipalmitoylphosphatidylinositol (DPPI), 1,2-dioleoyl-sn-glycero-3-phosphatidylinositol (DOPI), dimyristoylphosphatidylinositol (DMPI), distearoylphosphatidylinositol (DSPI), or combinations thereof.

In some embodiments, the lipid mixture comprises a first phospholipid and a second phospholipid. In some embodiments, the first phospholipid is selected from the group consisting of EPC, EPE, SPC, SPE, DPPC, DOPC, DMPC, HEPC, HSPC, DSPC, DOPE, PSPC, MOPE, POPC, and mixtures thereof; and the second phospholipid is selected from the group consisting of PG, PS, PA, PI and mixtures thereof. In some embodiments, the first phospholipid is EPC, EPE, SPC, SPE, DPPC, DOPC, DMPC, HEPC, HSPC, DSPC, DOPE, PSPC, MOPE, POPC, and mixtures thereof; and the second phospholipid is selected from the group consisting of EPG, EPS, EPA, EPI, SPG, SPE, SPS, SPA, SPI, DPPG, DOPG, DMPG, DSPG, PSPG, DPPS, DOPS, DMPS, DSPS, DPPA, DOPA, DMPA, DSPA, DPPI, DOPI, DMPI, DSPI, a hydrophilic polymer with a long chain of highly hydrated flexible neutral polymer attached to a phospholipid molecule, and mixtures thereof. Examples of the hydrophilic polymer include, but are not limited to, polyethylene glycol (PEG) with a molecular weight about 2,000 to about 5,000 daltons, methoxy PEG (mPEG), ganglioside $GM_1$, polysialic acid, polylactic acid (also termed polylactide), polyglycolic acid (also termed polyglycolide), polylacticpolyglycolic acid, polyvinyl alcohol, polyvinylpyrrolidone, polymethoxazoline, polyethyloxazoline, polyhydroxyethyloxazoline, polyhydroxypropyloxazoline, polyaspartamide, polyhydroxypropyl methacrylamide, polymethacrylamide, polydimethylacrylamide, polyvinylmethylether, polyhydroxyethyl acrylate, derivatized celluloses such as hydroxymethylcellulose or hydroxyethylcellulose and synthetic polymers.

In one embodiment, the lipid mixture further comprises a sterol. Sterol used in the present disclosure is not particularly limited, but examples thereof include cholesterol, phytosterol (sitosterol, stigmasterol, fucosterol, spinasterol, brassicasterol, and the like), ergosterol, cholestanone, cholestenone, coprostenol, cholesteryl-2'-hydroxyethyl ether, and cholesteryl-4'-hydroxybutyl ether. The sterol component of the lipid mixture, when present, can be any of those sterols conventionally used in the field of liposome, lipid vesicle or lipid particle preparation. In another embodiment, the lipid mixture comprises of about 10% to about 33% of cholesterol, about 15 to less than about 30 mole % of cholesterol, about 18 to about 28 mole % of cholesterol or about 20 to about 25 mole % of cholesterol.

In an exemplary embodiment, the lipid mixture comprises the first phospholipid, the second phospholipid and the sterol at a mole percent of 29.5% to 90%:3% to 37.5%:10% to 33%.

In further embodiments, the first phospholipid is DOPC, POPC, SPC, or EPC and the second phospholipid is PEG-DSPE or DOPG.

In further embodiments, the first phospholipid is DOPC and the second phospholipid is DOPG.

In one embodiment, the lipid mixture is free of fatty acid or cationic lipid (i.e., a lipid carrying a net positive charge at a physiological pH).

The liposomes prepared in this disclosure can be generated by conventional techniques used to prepare vesicles. These techniques include the ether injection method (Deamer et al., Acad. Sci. (1978) 308: 250), the surfactant method (Brunner et al., Biochim Biophys. Acta (1976) 455: 322), the freeze-thaw method (Pick et al., Arch. Biochim Biophys. (1981) 212: 186), the reverse-phase evaporation method (Szoka et al., Biochim Biophys. Acta. (1980) 601: 559 71), the ultrasonic treatment method (Huang et al., Biochemistry (1969) 8: 344), the ethanol injection method (Kremer et al., Biochemistry (1977) 16: 3932), the extrusion method (Hope et al., Biochim Biophys. Acta (1985) 812:55 65), the French press method (Barenholz et al., FEBS Lett. (1979) 99: 210) and methods detailed in Szoka, F., Jr., et al., Ann. Rev. Biophys. Bioeng. 9:467 (1980). All of the above processes are basic technologies for the formation of vesicles and these processes are incorporated by reference herein. After sterilization, the pre-formed liposomes are placed aseptically into a container and then lyophilized to form a powder or a cake. In the embodiment where the lipid mixture comprising pre-formed liposomes, said liposomes are obtained by solvent injection method and followed by lyophilization in the presence or absence of bulking agent(s) and/or buffering agent(s) to form the lipid mixture. In one embodiment, the lipid mixture comprises one or more bulking agents. In one embodiment, the lipid mixture further comprises one or more buffering agents.

The bulking agents include, but are not limited to, polyols or sugar alcohols such as mannitol, glycerol, sorbitol, dextrose, sucrose, and/or trehalose; and amino acids such as histidine, glycine. One preferred bulking agent is mannitol.

The buffering agents include, but are not limited to, sodium phosphate monobasic dihydrate and sodium phosphate dibasic anhydrous.

In the embodiment where the lipid mixture comprises lipids that are not pre-formed into liposomes, the lipid mixture can be prepared by dissolving in a suitable organic solvent, including, but not limited to, ethanol, methanol, t-butyl alcohol, ether and chloroform, and drying by heating, vacuum evaporation, nitrogen evaporation, lyophilization, or other conventional means of solvent removal.

Specific examples of lipid mixture preparation in support of the present disclosure will be described below.

Intra-Articular Corticosteroids

Intra-articular corticosteroid (IACS) is a current treatment recommendation for individuals with osteoarthritis by Osteoarthritis Research Society International (OARSI) guidelines for the non-surgical management of knee, hip and polyarticular osteoarthritis (Osteoarthritis and Cartilage 27 (2019) 1578-1589).

The IACS useful in the present disclosure includes any naturally occurring steroid hormones, synthetic steroids and their derivatives. Examples of the IACS, derivatives or a pharmaceutically acceptable salt thereof include, but are not limited to, Group B and Group C corticosteroid according to Coopman Classification (S. Coopman et al., "Identification of cross-reaction patterns in allergic contact dermatitis from topical corticosteroids" Br J Dermatol. 1989 July; 121(1): 27-34).

The pharmaceutically acceptable salts of the IACS include non-toxic salts formed from non-toxic inorganic or organic bases. For example, non-toxic salts can be formed with inorganic bases such as an alkali or alkaline earth metal hydroxide, e.g., potassium, sodium, lithium, calcium, or magnesium; and with organic bases such as an amine and the like.

The pharmaceutically acceptable salts of the IACS also include non-toxic salts formed from non-toxic inorganic or organic acids. Example of organic and inorganic acids are, for example, hydrochloric, sulfuric, phosphoric, acetic, succinic, citric, lactic, maleic, fumaric, palmitic, cholic, pamoic, mucic, D-glutamic, glutaric, glycolic, phthalic, tartaric, lauric, stearic, salicylic, sorbic, benzoic acids and the like.

In one embodiment, the IACS includes, but is not limited to, hydrocortisone acetate, methylprednisolone acetate, dexamethasone sodium acetate, dexamethasone sodium phosphate, betamethasone acetate, prednisolone, triamicinolone acetonide, and triamcinolone hexacetonide, which may be administered at a dose ranging from about 0.1 mg to about 300 mg, from about 0.1 mg to about 100 mg, from about 0.1 mg to about 20 mg, from about 0.1 mg to about 18 mg, from about 1 mg to about 300 mg, from about 1 mg to about 100 mg, from about 1 mg to about 20 mg, from about 1 mg to about 18 mg, from about 4 mg to about 300 mg, from about 4 mg to about 100 mg, from about 4 mg to about 20 mg, from about 4 mg to about 18 mg, from about 6 mg to about 18 mg, from about 6 mg to about 16 mg, from about 8 mg to about 16 mg, from about 6 mg to about 12 mg, from about 6 mg to about 16 mg, per mL of the pharmaceutical composition.

In one example, the IACS is dexamethasone sodium phosphate (DSP), The DSP is in a form of a solution and used as the solution containing the IACS as mentioned above to reconstitute the lipid mixture in a form of a cake to obtain the pharmaceutical composition of the present disclosure, resulting in the IACS of the pharmaceutical composition at a concentration of about 2 mg/mL to about 100 mg/mL, about 4 mg/mL to about 80 mg/mL, about 5 mg/mL to about 60 mg/mL, about 6 mg/mL to about 40 mg/mL, about 8 mg/mL to about 20 mg/mL, or about 10 mg/mL to about 16 mg/mL.

Effective dosages of the IACS in human may be higher than a recommended or standard dosage known in the art; for example, see *The Orthopaedic Journal of Sports Medicine,* 3(5), 2325967115581163 (DOI: 10.1177/2325967115581163), which is incorporated by reference herein. For example, while the recommended effective and tolerable dosage of triamcinolone hexacetonide as the IACS is 20 mg, the dosage of the IACS in the present compositions and methods may be at least 20 mg or higher.

The dosage of the IACS administered will also depend on the severity of the condition being treated, the particular formulation, and other clinical factors such as weight and the general condition of the recipient and severity of the side effect.

In some embodiments, the pharmaceutical composition may further comprise a target molecule including, but are not limited to, TNF-α and B cell surface antigen, such as CD20. Other antigens, such as CD19, HER-3, GD2, Gp75, CS1 protein, mesothelin, cMyc, CD22, CD4, CD44, CD45, CD28, CD3, CD123, CD138, CD52, CD56, CD74, CD30, Gp75, CD38, CD33, GD2, VEGF, or TGF may also be used. The target molecule could be in a form of a lipid-conjugate of an antibody or a peptide that acts as a targeting moiety to enable to specifically bind to a target cell bearing a target molecule to deliver the IACS to a desired microenvironment to achieve desired disease-modifying therapies.

Administration of the Pharmaceutical Composition

The pharmaceutical composition may be administered in a single dose treatment or in multiple dose treatments, over a period of time appropriate to the condition being treated. The pharmaceutical composition may conveniently be administered at appropriate intervals, for example, once over a period of a week, a fortnight, six weeks, a month, two months, at least 3 months, at least 6 months or until the symptoms and signs of the condition (i.e., joint pain) have resolved.

In a group of embodiments, the multiple dose treatment by at least two articular injections are administered at a dosing interval selected from the group consisting of two weeks, three weeks, four weeks, five weeks, six weeks, seven weeks, eight weeks, night weeks, ten weeks, eleven weeks, twelve weeks, thirteen weeks, fourteen weeks, fifteen weeks, sixteen weeks, seventeen weeks, eighteen weeks, nineteen weeks, twenty weeks, twenty-one weeks, twenty-two weeks and twenty-three weeks and twenty-four weeks.

In a group of embodiments, the multiple dose treatment by at least two articular injections are administered at a dosing interval of at least twelve weeks, such as thirteen weeks to six months.

In some embodiments, the pharmaceutical composition is administered at an amount ranging from about 0.5 mL to about 1.5 mL, about 0.6 mL to about 1.2 mL, about 0.8 mL to about 1.2 mL, or about 1.0 mL per articular injection.

In an exemplary embodiment, the pharmaceutical composition is administered in a single dose treatment, wherein the effective amount of intra-articular corticosteroid ranges from about 6 mg to about 18 mg, from about 10 mg to about 18 mg, from about 12 mg to about 18 mg, from about 10 mg to about 15 mg, from about 11 mg to about 13 mg, about 8 mg, about 9 mg, about 10 mg, about 11 mg, about 13 mg, about 14 mg, about 15 mg, or about 12 mg. The lipid mixture comprises the first phospholipid, the second phospholipid and the sterol at a mole percent ratio of 29.5% to 90%:3% to 37.5%:10% to 33%; and the total amount of the phospholipids is 50 µmol to about 140 µmol, 45 µmol to 135 µmol, 50 µmol to 120 µmol, or 60 µmol to 110 µmol.

The Method of Treating Joint Pain

One aspect of this disclosure is directed to a method of treating joint pain in a subject, comprising administering an effective amount of the pharmaceutical composition as described herein to the subject in need thereof, whereby the side effects induced by the IACS are reduced compared to the side effects in a subject following the administration of an immediate release or standard IACS formulation, and/or the efficacy and the release rate of the IACS of the pharmaceutical composition is increased compared to the efficacy and the release rate of a pharmaceutical composition with more than about 150 µmol of phospholipid per ml of the pharmaceutical composition.

In one embodiment, the subject has arthritis such as osteoarthritis, rheumatoid arthritis, acute gouty arthritis, psoriatic arthritis, reactive arthritis, arthritis due to Ehlers-Danlos Syndrome, haemochromatosis, hepatitis, Lyme disease, Sjogren's disease, Hashimoto's thyroiditis, celiac disease, non-celiac gluten sensitivity, inflammatory bowel disease, Henoch-Schönlein purpura, Hyperimmunoglobulinemia D with recurrent fever, sarcoidosis, Whipple's disease, TNF receptor associated periodic syndrome, Granulomatosis with polyangiitis, familial Mediterranean fever, or systemic lupus erythematosus.

A plain radiograph of knee joint or magnetic resonance imaging (MRI) can be used for evaluation of patients of osteoarthritis of knee joint. MRI is preferred as a diagnostic tool for evaluating the changes in bones as well as soft tissues in osteoarthritis of knee. Kellgren Lawrence grade of osteoarthritis could be evaluated on the basis of radiography of the joint of knee.

Kellgren and Lawrence classification system has been vastly used for classification of severity of osteoarthritis. Below is the original description:

grade 0 (none): definite absence of x-ray changes of osteoarthritis;

grade 1 (doubtful): doubtful narrowing of joint space and possible osteophytic lipping;

grade 2 (minimal): definite osteophytes and possible narrowing of joint space on posteroanterior weight-bearing radiograph;

grade 3 (moderate): moderate multiple osteophytes, definite narrowing of joint space and some sclerosis and possible deformity of bone ends;

grade 4 (severe): large osteophytes, marked narrowing of joint space, severe sclerosis and definite deformity of bone ends.

Osteoarthritis is deemed present at grade 2 although of minimal severity. This classification was proposed by Kellgren & Lawrence in 1957 and later accepted by the World Health Organization (WHO) in 1961 as the radiological definition of OA for the purpose of epidemiological studies.

The efficacy refers to the ability of the IACS to induce a favorable clinical response in a disease. The efficacy also refers to the reduction of clinical signs, such as joint pain, tenderness, transient morning stiffness, and crepitus on joint motion that leads to instability and physical disability. In one embodiment, the efficacy of the IACS is determined by the WOMAC OA index, VAS score or the like. In some embodiments, the sustained, steady state release of the IACS from the pharmaceutical composition described herein will not induce side effects including, but not limited to, articular cartilage damage or destruction, such as chondrocyte apoptosis, proteoglycan loss, cysts in articular cartilage, articular cartilage degradation or joint destruction. The reduction in side effects in a subject described herein can range from 1%, 5%, 10%, 20%, 30%, 40%, 50%, 60%, 70%, 80%, 90% or 100% when compared with a subject injected with the IACS not formulated with the pharmaceutical compositions described herein, e.g., without a lipid mixture.

The pharmaceutical composition provided herein can be used in combination with any of a variety of additional chemical entities, including but not limited to, analgesics (e.g., bupivacaine, ropivacaine, or lidocaine) or hyaluronic acid preparations (e.g., Synvisc One). In some embodiments, the claimed pharmaceutical composition and additional chemical entities are formulated into a single therapeutic composition, and the claimed pharmaceutical composition and the additional chemical entities are administered simultaneously. Alternatively, the claimed pharmaceutical composition and the additional chemical entities are separate from each other, e.g., each is formulated into a separate therapeutic composition, and the claimed pharmaceutical composition and the additional chemical entities are administered simultaneously, or at different times during a treatment regimen by the same route or different routes, as a single dose or multiple doses.

The disclosure will be further described with reference to the following specific, non-limiting examples.

EXAMPLES

The following examples illustrate the preparation and properties of certain embodiments of the present disclosure.

Example 1: Preparation of a Lipid Mixture

The lipids, including DOPC, DOPG and cholesterol, were combined at a mole percentage ratio of 56.25-72.5:7.5-18.75:10-33, for example 67.5:7.5:25, and dissolved in 99.9% ethanol at about 40° C. in a flask to form a lipid solution. A tabletop ultrasonic bath was used for lipid dissolution.

The dissolved lipid solution was added to 1.0 mM sodium phosphate solution at 100 mL/min by a peristaltic pump to form a pro-liposome suspension. The pro-liposome suspension was then passed 6 to 10 times through a polycarbonate membrane with a pore size of 0.2 μm. A liposome mixture was obtained and the liposomes had an average vesicle diameter of about 120-140 nm (measured by Malvern Zeta-Sizer Nano ZS-90, Malvern Instruments Ltd, Worcestershire, UK).

The liposome mixture was dialyzed and concentrated by a tangential flow filtration system with Millipore Pellicon 2 Mini Ultrafiltration Module Biomax-100C (0.1 m$^2$) (Millipore Corporation, Billerica, MA, USA) and then sterilized using a 0.2 μm sterile filter.

The lipid concentration of the filtered liposome mixture was quantified by phosphorous assay and the filtered liposome mixture was formulated with mannitol at a concentration of 2% mannitol and then sterilized again using a 0.2 μm sterile filter. The sterilized liposome mixture was then subject to lyophilization to obtain a lipid mixture in a form of cake.

Example 2: Preparation of a Pharmaceutical Composition

A pharmaceutical composition in accordance with the present disclosure was prepared by mixing the lipid mixture described in Example 1 with a DSP solution, which comprises 13.2 mg/ml dexamethasone sodium phosphate (DSP) ($C_{22}H_{28}FNa_2O_8P$; molecular weight: 516.41 g/L) and 4 mg/ml sodium citrate as DSP pharmaceutical composition used hereafter, whereby each mL of the pharmaceutical composition included about 12.0 mg/mL of DSP and about 90 μmol to 100 μmol of phospholipid(s).

Example 3. A Randomized, Open-Label Study of Efficacy and Safety of the Dexamethasone Sodium Phosphate (DSP) Pharmaceutical Composition in Patients with Knee Osteoarthritis DSP pharmaceutical composition was prepared by the previously described method. In a primary intent-to-treat analysis of a Phase 2 multi-center, randomized, double-blind, placebo-controlled clinical trial (ClinicalTrials.gov ID: NCT03005873), a single IA dose of the DSP pharmaceutical composition containing 12 mg DSP (denoted as TLC599 12 mg below) demonstrated significant and durable pain relief and improved function vs. placebo over 24 weeks in patients with knee OA pain. To examine the robustness of this efficacy response, the change in pain from baseline in pre-specified subgroups of the intent-to-treat population was analyzed.

Methods: In this Phase 2 study, subjects were eligible if they met the American College of Rheumatology Criteria for knee OA, with Kellgren-Lawrence (K-L) Grade 2 or 3 and visual analog scale (VAS) pain 5-9 (on a 1-10 scale) in the index knee. Patients were randomized in a 1:1:1 ratio to receive TLC599 with 12 mg DSP, 18 mg DSP or saline placebo; randomization was stratified by whether patients had bilateral knee pain defined as VAS pain score ≥3 in the non-index knee. The primary efficacy assessment was the Western Ontario and McMaster Universities Index pain subscale (WOMAC-Pain), normalized to a 0-4 scale. Least squares (LS) mean change from baseline was estimated using a mixed-effect model repeat measurement (MMRM) analysis with restricted maximum likelihood estimation using an unstructured covariance matrix for within-subject correlation, including factors of treatment, visit, and baseline value as fixed factors, site as random factor, and treatment-by-visit as interaction terms. Subgroup analyses used demographic and baseline factors specified in the statistical analysis plan, including categorized variables of gender, age 50-65 or >65 years, K-L Grade 2 or 3, unilateral or bilateral knee pain, baseline VAS pain score <7 or ≥7, or baseline WOMAC-Pain score <1.2 or ≥1.2.

TABLE 1

Demographic and Baseline Characteristics

| | Placebo (N = 25) | TLC599 12 mg (N = 26) |
|---|---|---|
| Age (Years) - Mean (SD) | 64.8 (8.45) | 63.9 (9.07) |
| 50 to 65 years - n (%) | 14 (56.0) | 16 (61.5) |
| ≥66 years - n (%) | 11 (44.0) | 10 (38.5) |
| Gender | | |
| Male - n (%) | 7 (28.0) | 11 (42.3) |
| Female - n (%) | 18 (72.0) | 15 (57.7) |
| BMI (kg/m$^2$) - Mean (SD) | 27.93 (4.655) | 27.65 (4.286) |
| <30 kg/m$^2$ - n (%) | 17 (68.0) | 17 (65.4) |
| ≥30 kg/m$^2$ - n (%) | 8 (32.0) | 9 (34.6) |
| Baseline VAS-Pain score - Mean (SD) | 6.56 (1.049) | 6.45 (1.113) |
| <7 - n (%) | 15 (60.0) | 18 (69.2) |
| ≥7 - n (%) | 10 (40.0) | 8 (30.8) |
| Baseline WOMAC Pain Score (0-4) - Mean (SD) | 1.62 (0.609) | 1.49 (0.558) |
| <1.2 - n (%) | 6 (24.0) | 5 (19.2) |
| ≥1.2 - n(%) | 19 (76.0) | 21 (80.8) |
| Knee Pain | | |
| Bilateral - n (%) | 15 (60.0) | 16 (61.5) |
| Unilateral - n (%) | 10 (40.0) | 10 (38.5) |
| Kellgren-Lawrence Grade | | |
| Grade 2 - n (%) | 9 (36.0) | 13 (50.0) |
| Grade 3 - n (%) | 16 (64.0) | 13 (50.0) |

BMI = body mass index, SD = standard deviation, VAS = visual analogue scale (0-10 scale), WOMAC = Western Ontario McMaster Universities OA Index (0-4 normalized scale).
Note:
Bilateral knee pain defined as VAS pain score ≥3 in the non-index knee.

Demographic and baseline characteristics including categories for subgroups are summarized for TLC599 12 mg and placebo groups in Table 1. Factors were generally similar between groups; compared to placebo, the TLC599 12 mg group had more male patients (42% vs 28%) and more patients with K-L Grade 2 (50% vs 36%). Of patients receiving the blinded treatment, 25 of 26 (96%) of the TLC599 12 mg group and 22 of 25 (88%) of the placebo group completed the study. FIG. 1 shows the change from the baseline in WOMAC-Pain for the overall population. FIG. 2 shows the change for disease severity subgroups by factors of gender and age, while FIG. 3 shows the change for disease severity subgroups by K-L grade and bilateral knee pain status. The changes for disease severity subgroups by baseline VAS and baseline WOMAC-Pain are presented in FIG. 4. Overall, mean reduction in pain was noted with both treatments starting at Week 1; significant differences between groups were maintained through Week 24. Reductions in pain were greater in patients with greater baseline pain score by VAS or WOMAC-Pain.

The pattern of efficacy seen in the overall population, with greater reductions in pain with TLC599 12 mg than with placebo sustained from Week 1 through Week 24, was remarkably consistent between subgroups. Mild imbalances between groups in gender and KL grade at baseline did not appear to affect the results, as similar trends in these subgroups were observed. When the efficacy of TLC599 12 mg was then compared following stratification of the population according to: American College of Rheumatology Criteria for knee OA, with Kellgren-Lawrence (K-L) Grade: Grade 2 and Grade 3; male and female; age 55-65 and age over 65; unilateral OA pain and bilateral OA pain, differential efficacy is observed during weeks particularly to Week 12. Results are presented in Table 2 below.

TABLE 2

LS Mean (SE) change from baseline in WOMAC-pain by K-L grade, gender, and unilateral/bilateral knee pain at Week 12 following single IA injection of TLC599 12 mg or Placebo

| Subgroup | TLC599 12 mg | Placebo |
|---|---|---|
| K-L Grade 2 | −0.78 (0.140) | −0.51 (0.188) |
| K-L Grade 3 | −1.00 (0.184) | −0.44 (0.169) |
| Male | −0.82 (0.168) | −0.52 (0.207) |
| Female | −1.05 (0.143) | −0.49 (0.137) |
| Age 50-65 | −0.98 (0.158) | −0.67 (0.172) |
| Age ≥66 | −0.88 (0.178) | −0.20 (0.184) |

What is claimed is:

1. A method for treating joint pain in a human subject with Kellgren-Lawrence Grade 2 or Grade 3 osteoarthritis, comprising intraarticularly administering to the human subject with a pharmaceutical composition comprising an effective amount of intra-articular corticosteroid or pharmaceutically acceptable salt thereof and a lipid mixture,
   wherein the intra-articular corticosteroid or pharmaceutically acceptable salt thereof is selected from the group consisting of dexamethasone sodium phosphate, dexamethasone, dexamethasone sodium acetate, betamethasone, betamethasone sodium phosphate, betamethasone acetate, betamethasone dipropioinate, betamethasone valerate and a combination thereof;
   wherein the effective amount of intra-articular corticosteroid ranges from about 10 mg to about 18 mg; and
   wherein the human subject with Kellgren-Lawrence Grade 3 osteoarthritis has greater LS Mean change from baseline in WOMAC pain than the subject with Kellgren-Lawrence Grade 2 osteoarthritis.

2. The method of claim 1, wherein the pharmaceutical composition is administered at a total amount ranging from 0.5 mL to 1.5 mL.

3. The method of claim 1, wherein the pharmaceutical composition is administered at a total amount of 1.0 mL.

4. The method of claim 1, wherein the osteoarthritis is evaluated for a determined grade by radiography or magnetic resonance imaging of a joint of the human subject, with multiple osteophytes observed in the joint of the human subject.

5. The method of claim 1, wherein the human subject is at an age between 50 to 65 or over 65.

6. The method of claim 1, wherein the human subject is female.

7. The method of claim 1, wherein the human subject has unilateral osteoarthritis pain or bilateral osteoarthritis pain.

8. The method of claim 1, wherein the human subject has body mass index above about 30.

9. The method of claim 1, wherein the lipid mixture comprises a phosphatidylcholine, a phosphatidylglycerol and cholesterol.

10. The method of claim 1, wherein the intra-articular corticosteroid is dexamethasone sodium phosphate.

11. The method of claim 1, wherein the effective amount of intra-articular corticosteroid ranges from about 12 mg to about 18 mg.

12. The method of claim 9, wherein the phosphatidylcholine is dioleoylphosphatidylcholine and the phosphatidylglycerol is dioleoylphosphatidylglycerol.

13. The method of claim 12, wherein the dioleoylphosphatidylcholine, dioleoylphosphatidylglycerol and cholesterol are at a ratio of 56.25-72.5:7.5-18.75:10-33 by mole percent based on the total moles of the lipid mixture.

14. The method of claim 1, wherein the osteoarthritis is knee osteoarthritis.

* * * * *